3,469,639
MACHINE FOR TAKING SAMPLES FROM A CONDUIT WALL
Jean Charlade, Gard, France, assignor to Commissariat a l'Energie Atomique, Paris, France
Filed July 8, 1966, Ser. No. 563,817
Claims priority, application France, July 22, 1965, 25,693
Int. Cl. E21b 7/04, 49/06
U.S. Cl. 175—78                                        1 Claim

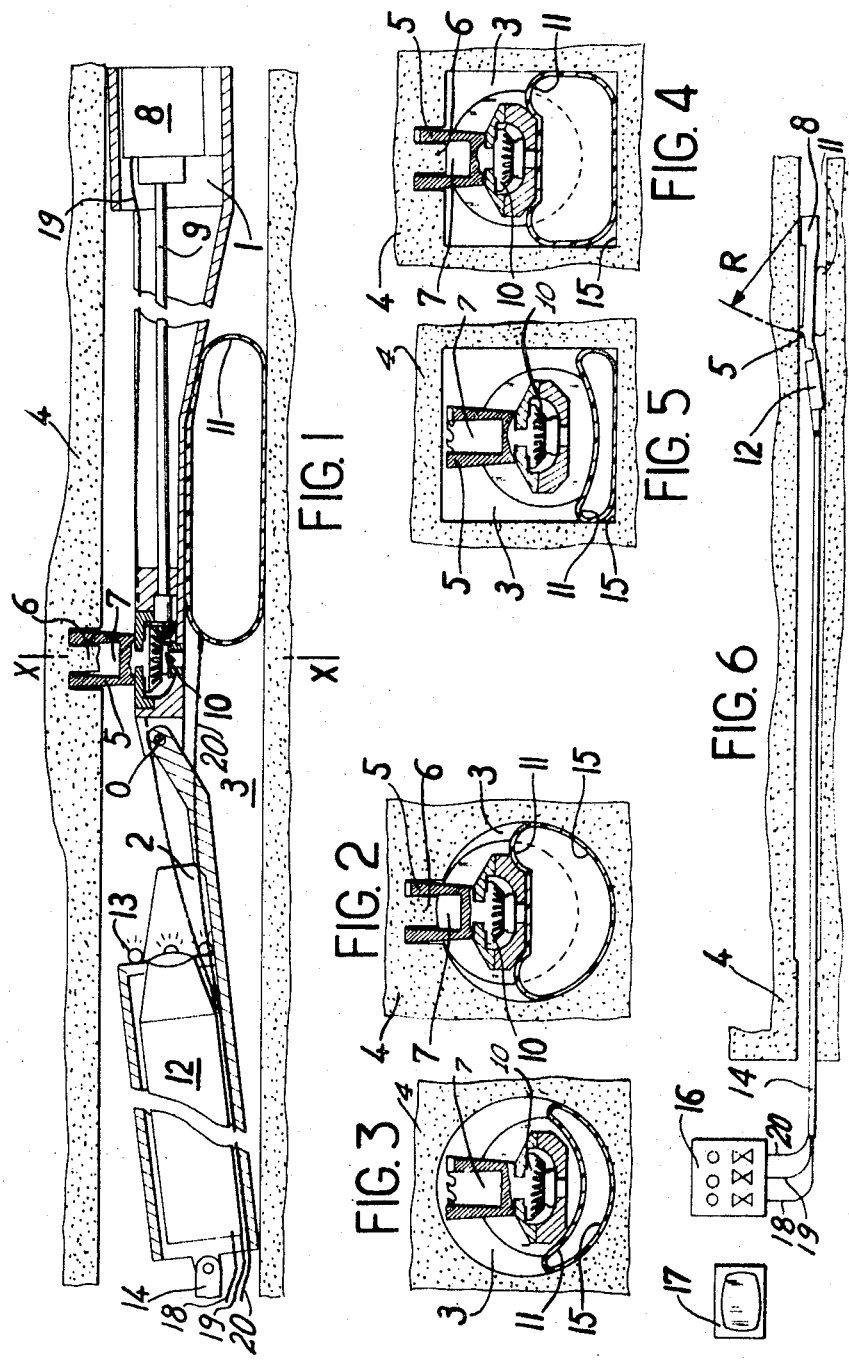

ABSTRACT OF THE DISCLOSURE

Apparatus for taking a core sample through the wall of a passageway where a rotary cutting tool is applied against the wall by pneumatic means and the cutting is monitored by a television camera.

---

This invention relates to a method and a machine for taking samples over an appreciable distance from the wall of a conduit or passage of any section which may or may not have a rectilinear axis, the sampling operation being continuously monitored by means of a television set.

Machines at present used for taking samples from the walls of a conduit or passage extending through a large mass of material are driven by an external motor. The use of these machines is therefore limited by the demands of the mechanical transmission and by the absence of any visual monitoring.

The machine according to this invention obviates such a limitation and is of particular use for the taking of samples of graphite from a nuclear reactor.

It is well-known that in a graphite-moderated reactor it is very important to monitor the variation of the energy stored by the graphite subjected to neutron flux. A knowledge of the amount of energy releasable when the graphite is annealed allows the annealing time and the temperatures which can be reached during annealing to be determined. This energy can be ascertained by periodic examination of samples taken in the form of small cylinders from the inner walls of reactor channels.

Sampling must be carried out in exactly defined places and without affecting the properties of the graphite (more particularly without raising its temperature during the cutting operation).

Known machines have the disadvantage of requiring a complicated and fragile transmission of very poor efficiency between the motor (outside the reactor) and the cutting tool (in the core of the graphite pile), the distance between the motor and the tool ranging up to 15 or 20 metres. Also, the operations are carried out blind without direct monitoring of the operation, which is carried out in a passage of a diameter of only 70 mm. in the case of some reactors.

The method and machine according to this invention avoids such disadvantages.

According to one aspect of the invention there is provided a method of taking samples, if necessary over an appreciable distance, from the wall of a conduit or passage of any cross-section, irrespective of whether the axis is or is not rectilinear, by means of a cutting tool, the method comprising using a machine having a built-in driving motor and a built-in television camera, and remotely controlling from outside the said passage the operation of said motor and said camera and the position of the said tool and the pressure by which said tool is applied to the wall of said passage during the sampling operation.

According to another aspect of the invention there is provided a machine for taking samples from the wall of a conduit or passage by means of a cutting tool for performing the said method, the said machine comprising a driving motor and a television camera and being characterised in that it comprises a first part containing the said motor, the said tool and a container to receive the samples, a second part pivotally connected to the said first part and bearing a television camera directed to the said tool and to the said container, a resilient device disposed beneath the said first part below the cutting tool in order to apply the latter firmly against the wall of the conduit during the taking of a sample, rigid connecting rods secured to the said second part and enabling the cutting position of the said tool to be accurately controlled from outside the conduit, and means borne by said rods and used for remote-control of the operation of the said motor and the television camera and controlling the pressure exerted by the said resilient device on the said tool.

The resilient device may for example be a sac or a small jack.

The invention will now be described by way of example with reference to the accompanying drawings which illustrate a preferred embodiment of the sampling machine used, for example, for taking graphite samples from a nuclear reactor.

In the drawings:

FIGURE 1 is a longitudinal section of the frame with the tool in the conduit cutting position;

FIGURE 2 is a section on the line X—X in FIGURE 1, the conduit being of circular cross-section;

FIGURE 3 corresponds to FIGURE 2 but with the tool in the inoperative position;

FIGURES 4 and 5 are respectively corresponding illustrations to FIGURES 2 and 3 but relating to a square-section conduit; and FIGURE 6 is a section of the complete sampling machine according to the invention.

Referring to FIG. 1, the frame of the sampling machine consists of two parts 1 and 2 pivotally connected at 0 and housed in a passage 3, and the wall 4 of which it is required to cut in order to take a sample therefrom.

The part 1 of the frame bears a cutting tool, in this case an end milling cutter 5, which takes a sample 6 from the wall and which has a cavity 7; it also carries a motor 8 which drives the milling cutter 5 through the shaft 9 and a 90° bevel reduction gear 10.

Beneath this part 1 of the frame is disposed a pneumatic device, e.g. a sac 11, which firmly applies the milling cutter 5 against the wall 4 during the sampling operation.

The part 2 of the frame bears a television camera 12 and a ring of lamps 13.

FIG. 6 shows that the sampling machine according to the invention also comprises a string of rods 14 in addition to the elements shown in FIG. 1, these rods being used to introduce the frame and being secured to part 2 thereof, which also accommodates electrical supply 19 for the motor 8, electrical supply 18 for television camera 12 and pneumatic supply 20 for sac 11.

These elements lead to a control panel 16 and a television receiver 17 providing direct visual monitoring of the cutter 5.

In particular, the panel 16 comprises a pressure reducer (not shown) for adjustment of the air pressure in the sac 11 and a rheostat or control valve (not shown) to control the motor 8, depending on whether the latter is a variable-speed electric motor or a pneumatic motor.

FIG. 2 (a passage of circular cross-section) and FIG. 4 (a passage of square cross-section) show the inflated sac 11 bearing against the bottom part 15 of the conduit or passage 3 and causing the cutter 5 to penetrate into the material of the wall 4 for analysis.

In FIGS. 3 and 5 the cutter 5 is in the inoperative state, the sac 11 being deflated.

The sampling machine according to the invention operates as follows:

The frame (parts 1 and 2) is first introduced into the passage 3 by means of elements of the string of rods 14 to which other elements are fitted as the machine advances into the passage.

These elements are graduated as from the cutter 5 so that the position of the machine in the passage 3 is always known. Also, the rods 14 are rigid in respect of rotation so that the frame (1 and 2) can be oriented to any required direction.

Once the frame has been installed in the required position, the motor 8 is started from the control panel 16 and the sac 11 is progressively inflated, again from panel 16.

Motor 8 rotates cutter 5 while sac 11 bears against part 15 of the passage to apply the cutter firmly against the wall 4 so that it can form a circular groove and cut a sample from the wall 4.

Displacement of the cutter 5 is effected over an arc of a circle of a large radius R (length of part 1 of the frame) to a fairly small amplitude (length of the sample). The relief angle of the cutter (for example 3°) is sufficient to prevent any wedging. During simultaneous rotation and feed of the cutter the operator at all times monitors the tool work from the picture provided by the camera on the television receiver 17. When the cutter 5 has penetrated sufficiently, the operator stops motor 8 and breaks the sample 6 simply by jerking on the string of rods 14. The sac is then deflated, cutter 5 is lowered and the picture on the receiver 17 shows whether the sample is in the cavity 7 provided in the cutter. The frame 1, 2 is then withdrawn by means of the rod string and the sample 6 is recovered. In the case of a pneumatic motor 8, if the motor exhaust is correctly channeled it will be sufficient for cooling the cutter no matter what fluid is used. In the case of an electric motor, the cutter is cooled by an injection of gas as in the prior art apparatus.

I claim:

1. A machine for taking samples from the wall of a conduit of any cross-section and of any profile comprising a first part containing a motor, a cutting tool driven by said motor and a container receiving the samples cut by said tool, a second part pivotally connected to said first part and bearing a television camera directed on said tool and on said container, an inflatable sack beneath said first part below said cutting tool, rigid connecting rods secured to said second part for accurate location of the cutting position of said tool from outside the conduit, electrical supply means associated with said rods for remote control of said motor and of said television camera and pneumatic supply means controlling the pressure exerted by said sack on said tool.

References Cited

UNITED STATES PATENTS

| | | | |
|---|---|---|---|
| 2,546,670 | 3/1951 | Kirby | 175—78 |
| 2,725,283 | 11/1955 | Mounce et al. | 175—78 X |
| 2,812,697 | 11/1957 | Laval. | |
| 3,107,740 | 10/1963 | Cante | 175—78 |
| 3,169,588 | 2/1965 | Cashen et al. | 175—51 |
| 3,199,613 | 8/1965 | Malott et al. | 175—5 |

LOUIS R. PRINCE, Primary Examiner

DANIEL M. YASICH, Assistant Examiner

U.S. Cl. X.R.

73—421; 175—40